United States Patent [19]
Omori et al.

[11] 3,947,946
[45] Apr. 6, 1976

[54] METHOD AND APPARATUS FOR COUPLING TWO SINGLE ROWS OF CONTINUOUS ELEMENTS FOR A SLIDE FASTENER

[75] Inventors: Shigenori Omori, Uozu; Makoto Yoshida, Kurobe, both of Japan

[73] Assignee: Yoshida Kogyo Kabushiki Kaisha, Japan

[22] Filed: Aug. 25, 1975

[21] Appl. No.: 607,188

[30] Foreign Application Priority Data
Sept. 5, 1974  Japan.............................. 49-102235

[52] U.S. Cl............................... 29/408; 29/207.5 R
[51] Int. Cl.².......................................... B21D 53/50
[58] Field of Search....... 29/408, 410, 207.5 R, 433, 29/33.2, 241

[56] References Cited
UNITED STATES PATENTS
2,219,165  10/1940  Nedal.................................... 29/408
3,078,558  2/1963  Langwell............................... 29/408
3,703,026  11/1972  Uhrig........................ 29/207.5 R X
3,714,698  2/1973  Fukuroi................................. 29/408
3,836,413  9/1974  Frohlich et al. .................. 29/408 X

*Primary Examiner*—Victor A. DiPalma
*Attorney, Agent, or Firm*—Bucknam and Archer

[57]  ABSTRACT

There are disclosed a method and apparatus for coupling or pairing, prior to attachment to fastener carrier tapes, two single rows of continuous elements for a slide fastener into a double element row, the two rows having been discharged respectively from a pair of separately located element shaping and transporting machines having different power sources. The speeds of both of discharge of the two single element rows and of withdrawal of the combined or double element row are selectively changed with the two single element rows advanced under constant tension, in order to ensure accurate and efficient coupling of the element rows even in the event the two machines operate out of complete synchronism to discharge the element rows at different rates of speed.

6 Claims, 1 Drawing Figure

U.S. Patent   April 6, 1976   3,947,946
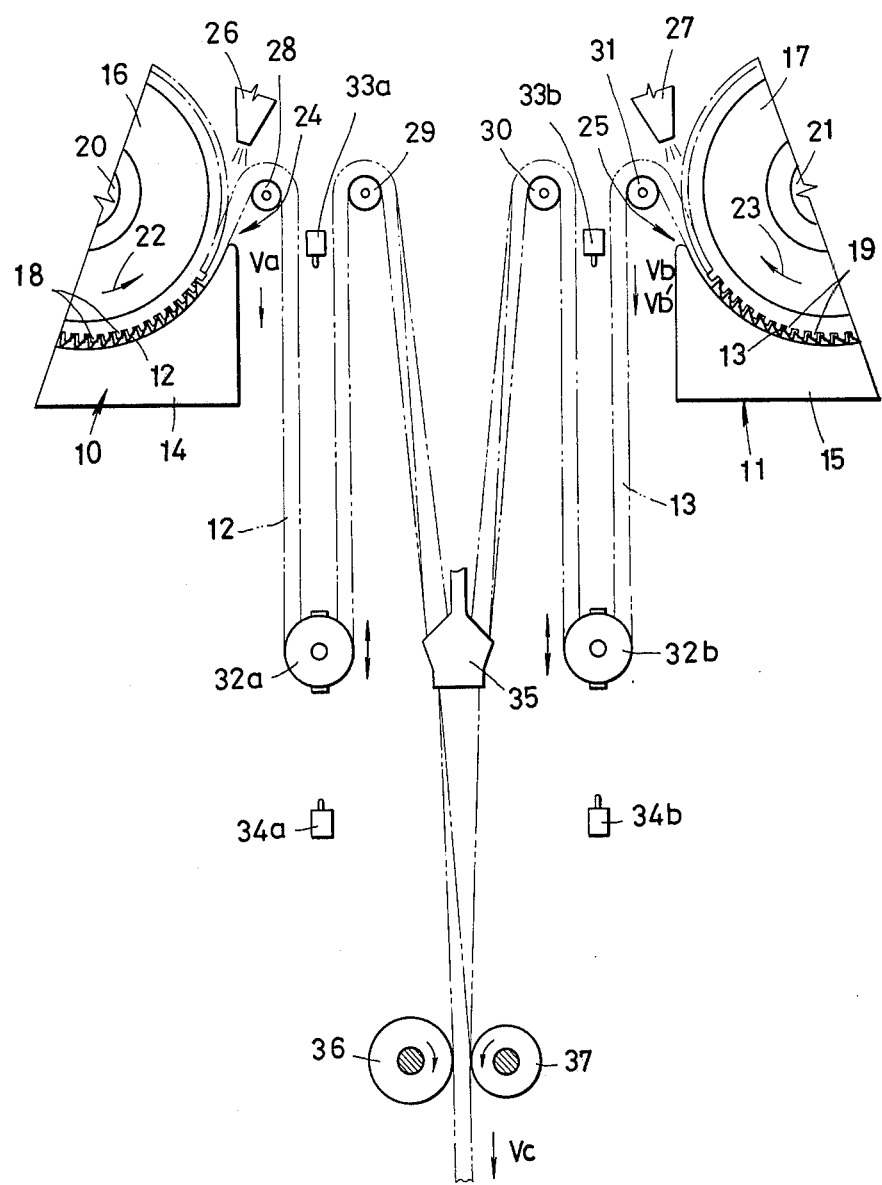

METHOD AND APPARATUS FOR COUPLING TWO SINGLE ROWS OF CONTINUOUS ELEMENTS FOR A SLIDE FASTENER

BACKGROUND OF THE INVENTION

This invention relates to methods and apparatus for coupling two single rows of continuous elements for a slide fastener into a double element row and more particularly to a method and apparatus for coupling two single element rows which have been discharged respectively from a pair of separately located element shaping and transporting machines having different power sources, said method and apparatus giving a constant tension to the rows of elements and controlling the speeds of both of discharge of the respective single element rows and of withdrawal of the combined or double element row.

In the production of a pair of fastener stringers each carrying on and along its one longitudinal edge a row of continuous fastener elements, it has been customary to mesh together the respective rows of fastener elements and thereafter secure them to the respective tapes by means for example of sewing operation. It is therefore necessary to provide a procedure whereby the two single rows of continuous fastener elements are coupled together prior to attachment to the carrier tapes. This procedure is desirable from the viewpoint of preventing such continuous fastener elements as in a meandering or a coil form from getting entangled or twisted due to deformation of the elements which would otherwise take place when the element rows are stored unpaired for extended periods of time.

One prior attempt to intermesh the two rows of continuous fastener elements was to use a single machine in which are provided in symmetric relation two separate element forming apparatus driven by a common power source and which is therefore capable of producing a pair of rows of continuous fastener elements at a synchronous rate of speed so that the respective element rows discharged can be readily coupled together. However, such prior art machines would become considerably large in size and require increased power to keep its operation. They were furthermore inconvenient to manipulate and difficult to dismount, assemble or service because the two apparatus had to be located remotely in parallel.

Another prior art attempt was to intermesh the rows of fastener elements which have been continuously discharged in opposite direction from a pair of separately located element forming machines driven by different sources of power. However, it was very difficult to equalize the number of revolutions of one of the two power sources accurately with that of the other, with the results that the rates of discharge speed of the two single element rows would become different one from the other and furthermore the tension applied to one row of elements would accordingly vary relative to that applied to the other element row.

SUMMARY OF THE INVENTION

A primary object of the invention is therefore to provide a method of coupling or pairing a pair of two single rows of continuous fastener elements discharged from a pair of separately powered element forming machines, which method ensures accurate and efficient coupling of the respective rows of elements under constant tension even in the event the two machines operate out of complete synchronism to discharge the rows of fastener element at different rates of speed.

Another object of the invention is to provide an apparatus for carrying the above method into practice.

Briefly stated, the method of the invention comprises: guiding the single element rows around respective tension-applying means each movable between an upper limit position and a lower limit position and adapted to impart constant tension to said single element rows; advancing either one of the two single element rows at a speed different from the speed of travel of the other single element row; coupling said two single element rows together into a double element row; withdrawing the double element row at a speed higher than the speed of travel of either of said single element rows; discontinuing the withdrawal of said double element row when either of said tension-applying means arrives at the upper limit position; and resuming the withdrawal of said double element row and simultaneously maintaining or shifting the speed of travel of either of said single element rows from high to low or vise versa, when either tension-applying means arrives at the lower limit position.

Other objects and advantages of the invention will become apparent upon reading the following specification with reference to the accompanying drawing which illustrates by way of example a preferred embodiment.

BRIEF DESCRIPTION OF THE DRAWING

The drawing is a schematic, elevational view of a pairing machine.

DESCRIPTION OF THE PREFERRED EMBODIMENT

Referring now to the drawing, there is shown a preferred form of apparatus for coupling and pairing two single rows of continuous fastener element which comprises a pair of element shaping and transporting machines 10 and 11 for forming respective rows 12 and 13 of continuous fastener elements. The element shaping and transporting machines 10 and 11 are located in spaced apart, opposed relation and symmetrically with respect to an elements coupling section as referred to later. The machines 10 and 11 comprise respective frames 14 and 15, and respective die wheels 16 and 17 rotatably mounted on the frames 14 and 15. The die wheels 16 and 17 are provided around its periphery with teeth 18 and 19, respectively, which are adapted to heat-set the fastener elements that have been shaped. There may be used rotatable screws having element forming threads in lieu of the die wheels. The die wheels 16 and 17 are rotatable about respective shafts 20 and 21 in opposite directions as indicated by the arrows 22 and 23 to advance and discharge the fastener element rows 12 and 13 through discharging ports 24 and 25 of the respective die wheels. Designated at 26 and 27 are air nozzles for blowing air to cool the fastener element rows 12 and 13, respectively, upon departure from the machines 10 and 11. The element forming machines 10 and 11 are driven by separate power sources, not shown, such as motors, to withdraw the fastener element rows 12 and 13 but in which instance the two single rows of elements 12 and 13 are usually moved on at slightly different speeds for reasons already stated.

There are provided two pairs of spaced guide rollers 28, 29 and 30, 31 rotatable adjacent the discharging ports 24 and 25 of the respective die wheels 16 and 17. The fastener element rows 12 and 13 are trained around and depend between the guide rollers 28, 29 and between the guide rollers 30, 31, respectively. The fastener element rows 12 and 13 are tensioned constantly by tension-applying rollers 32a and 32b guided therearound, respectively, which have the same weight and are vertically movable between respective pairs of detector switches 33a, 34a and 33b, 34b such for example as limit switches or photoelectric cells which are spaced vertically a predetermined distance apart and adapted to detect and control the upper and lower limit positions of the respective tension-applying rollers 32a, 32b. The elements coupling or pairing section comprises a slider-shaped coupling means 35 which is provided centrally between the guide rollers 29 and 30 and which includes therein a generally Y-shaped guide channel, not shown, for the passage and coupling of the fastener element rows 12 and 13 which have been advanced past the guide rollers 29 and 30, respectively. Located downwardly of the coupling means 35 are a drive roller 36 and a pinch roller 37 for withdrawing the element rows 12 and 13 that have been coupled together.

OPERATION

Let it now be assumed that the element forming machine 10 issues the continuous fastener element row 12 at a speed of $Va$ and the opposite element forming machine 11 issues the continuous element row 13 selectively at a speed of $Vb$ or $Vb'$. The relationship between these speeds is $Vb > Va > Vb'$. The selection of the speeds $Vb$ and $Vb'$ can be made by changing the rotating speed of the die wheel 17 of the element forming machine 11 through an unshown speed change gear. Closing the switch 34a causes the die wheel 17 to advance the element row 13 at higher speed $Vb$. When the switch 34b is closed, then the die wheel 17 is caused to advance the element row 13 at lower speed $Vb'$. The fastener element rows 12 and 13 after being paired are discharged by the drive roller 36 at a speed of $Vc$. The speed $Vc$ is set to satisfy the following relation: $Vc > Va$, $Vb$, $Vb'$. The drive roller 36 can be selectively stopped by actuating a suitable clutch, not shown, connected to the drive roller 36. The clutch may be disconnected by closing either of the switches 33a and 33b and connected by closing either of the switches 34a and 34b.

Now, if the fastener element row 12 moves at the speed $Va$, the fastener element row 13 at the speed $Vb$ and the paired fastener element rows or a double element row at the speed $Vc$, the tension-applying rollers 32a and 32b will ascend because $Vc$ is greater than $Va$ and $Vb$. Since $Vb$ is greater than $Va$, the tension-applying roller 32a will ascend and contact the upper limit switch 33a whereupon the clutch is disconnected to discontinue the rotation of the drive roller 36. Simultaneously with this, the tension-applying rollers 32a and 32b both start descending. Since $Vb$ is still greater than $Va$ and the tension-applying roller 32b will descend and contact the lower limit switch 34b, the drive roller 36 resumes its rotation and discharges the paired continuous element rows at the speed $Vc$ and at the same time the die wheel 17 is caused to feed the element row 13 at the lower speed $Vb'$. With the drive roller 36 thus back in rotation, the tension-applying rollers 32a and 32b will ascend until either of them contacts either of the upper limit switches 33a and 33b, whereupon the driving roller 36 is again brought to a stop. Subsequently, when the lower limit switch 34a is first engaged by the tension-applying roller 32a descending faster than the tension-applying roller 32b, the drive roller 36 resumes rotation and at the same time shifts the speed of the element row at the element shaping and transporting machine 11 from $Vb'$ to $Vb$. It will be appreciated that if the tension-applying roller 32a contacts the lower limit switch 34a with the element row 13 advancing at the speed $Vb$, this speed $Vb$ remains unchanged. Similarly, if the tension-applying roller 32b contacts the lower limit switch 34b with the element row 13 moving at the speed $Vb'$, this speed $Vb'$ remains unchanged.

Having thus described the operation of the invention, it will be understood that even in the event either one of the two single continuous fastener element rows 12 and 13 should travel at a speed either higher or lower than the speed of the other element row, both rows of elements can be accurately registered with each other and coupled together under a constant tension applied by the respective tension-applying rollers 32a and 32b.

What is claimed is:

1. A method of coupling or pairing two single rows of continuous element for a slide fastener which have been discharged continuously from a pair of separately located element forming and transporting stations, comprising:

guiding the single continuous fastener element rows around respective tension-applying means each movable between an upper limit position and a lower limit position and adapted to impart constant tension to said single element rows;

advancing either one of the two single element rows at a speed different from the speed of travel of the other single element row;

coupling said two single element rows together into a double element row;

withdrawing the double element row at a speed higher than the speed of travel of either of said single element rows;

discontinuing the withdrawal of said double element row when either of said tension-applying means arrives at the upper limit position; and resuming the withdrawal of said double element row and simultaneously maintaining or shifting the speed of travel of either of said single element rows from high to low or vise versa, when either tension-applying means arrives at the lower limit position.

2. An apparatus for coupling or pairing two single rows of continuous element for a slide fastener which comprises:

a pair of oppositely disposed element shaping and transporting means rotatable in opposite directions and at different speeds for advancing the respective single element rows;

a pair of upper and lower limit switching means operatively associated with each of said shaping and transporting means;

a pair of tension-applying means each adapted to impart constant tension to said respective single element rows and each movable between said upper and lower limit switching means;

coupling means for coupling said two single element rows into a double element row; and withdrawing means for withdrawing said double element row at a speed higher than the speed of travel of either of said single element rows, either one of said tension-applying means engageable with said upper limit switching means to discontinue the withdrawal of said double element row and with said lower limit switching means to change the speed of travel of either of said single element rows and simultaneously to resume the withdrawal of said double element row.

3. An apparatus as defined in claim 2 wherein said pair of element shaping and transporting means each comprise a rotatable die wheel having around its periphery teeth adapted to heat-set the fastener elements.

4. An apparatus as defined in claim 2 wherein said pair of tension-applying means comprise rollers having the same weight.

5. An apparatus as defined in claim 2 wherein said coupling means comprises a slider-shaped structure having a generally Y-shaped guide channel for the passage of the two single element rows.

6. An apparatus as defined in claim 2 wherein said withdrawing means comprises a drive roller and a pinch roller.

* * * * *